US008518225B2

(12) United States Patent
Sumita et al.

(10) Patent No.: US 8,518,225 B2
(45) Date of Patent: Aug. 27, 2013

(54) APPARATUS AND METHOD FOR PRODUCING HYDROGEN-DISSOLVED DRINKING WATER

(75) Inventors: Osao Sumita, Tokyo (JP); Shin Gyo Yim, Suwon-si (KR)

(73) Assignee: Spring Co., Ltd., Tokyo (JP)

( * ) Notice: Subject to any disclaimer, the term of this patent is extended or adjusted under 35 U.S.C. 154(b) by 181 days.

(21) Appl. No.: 12/998,265

(22) PCT Filed: Oct. 16, 2009

(86) PCT No.: PCT/JP2009/005406
§ 371 (c)(1),
(2), (4) Date: Apr. 21, 2011

(87) PCT Pub. No.: WO2010/044272
PCT Pub. Date: Apr. 22, 2010

(65) Prior Publication Data
US 2011/0198236 A1    Aug. 18, 2011

(30) Foreign Application Priority Data
Oct. 17, 2008    (JP) .................................. 2008-268671

(51) Int. Cl.
C25B 9/08    (2006.01)
C25B 9/10    (2006.01)
C02F 1/461    (2006.01)
(52) U.S. Cl.
USPC ........................... 204/263; 204/252; 205/746
(58) Field of Classification Search
USPC ................ 204/257, 263, 266; 205/746, 747, 205/748, 758; 210/251, 295, 322, 335
See application file for complete search history.

(56) References Cited

U.S. PATENT DOCUMENTS 3,933,610 A * 1/1976 Ehara et al. .................... 204/529
5,484,512 A * 1/1996 Sasaki et al. ................... 205/628
(Continued)

FOREIGN PATENT DOCUMENTS
CN    101484391 A    7/2009
JP    H09-210950    8/1997
(Continued)

OTHER PUBLICATIONS

Ikuroh Ohsawa et al., "Hydrogen acts as a therapeutic antioxidant by selectively reducing cytotoxic oxygen redicals," May 7, 2007.

Primary Examiner — Keith Hendricks
Assistant Examiner — Steven A. Friday
(74) Attorney, Agent, or Firm — Manabu Kanesaka

(57) ABSTRACT

An apparatus for producing in the home hydrogen-dissolved drinking water that is suitable for drinking, has a high dissolved hydrogen concentration, and a long dissolved hydrogen life. A hydrogen-dissolved drinking water production apparatus includes an electrolytic cell through which water can pass for producing drinking water having a pH in a range of 2.5 to 8.5, and in particular, in a range of 5.8 to 8.5, and a dissolved hydrogen concentration of 0.1 ppm or more by supplying high-purity water having a conductivity of 50 μS/cm or less. The hydrogen-dissolved drinking water production apparatus is characterized in that the electrolytic cell includes a vertical anode chamber having a water-permeable plate-like anode electrode and a vertical cathode chamber having a plate-like cathode electrode, the anode chamber and the cathode chamber are separated by a diaphragm formed from a fluorine-based cation exchange membrane, the water-permeable plate-like anode electrode is closely adhered to the diaphragm formed from the fluorine-based cation exchange membrane, and an ion-exchange resin is filled in a space between the diaphragm and the cathode electrode.

10 Claims, 10 Drawing Sheets

(56) References Cited

U.S. PATENT DOCUMENTS

| | | | |
|---|---|---|---|
| 6,143,163 A * | 11/2000 | Sawamoto et al. | 205/742 |
| 6,254,762 B1 * | 7/2001 | Uno et al. | 205/466 |
| 6,890,417 B2 * | 5/2005 | Yamashita et al. | 205/335 |
| 2003/0056805 A1 * | 3/2003 | Sumita | 204/252 |
| 2004/0245104 A1 * | 12/2004 | Aikawa et al. | 205/50 |
| 2005/0189237 A1 * | 9/2005 | Sano | 205/746 |
| 2008/0302651 A1 | 12/2008 | Arai et al. | |
| 2009/0311342 A1 * | 12/2009 | Sumita | 424/639 |

FOREIGN PATENT DOCUMENTS

| | | |
|---|---|---|
| JP | 2000-160381 | 6/2000 |
| JP | 2002-273428 | 9/2002 |
| JP | 2003-245669 | 9/2003 |
| JP | 2005-329375 | 12/2005 |
| JP | 2008-036521 | 2/2008 |
| WO | WO 2006/016564 | 2/2006 |
| WO | WO 2008/015867 | 2/2008 |
| WO | WO 2008112253 A1 * | 9/2008 |

* cited by examiner (a)   (b)

APPARATUS AND METHOD FOR PRODUCING HYDROGEN-DISSOLVED DRINKING WATER

RELATED APPLICATIONS

The present application is National Phase of International Application No. PCT/JP2009/005406 filed Oct. 16, 2009, and claims priority from Japanese Application No. 2008-268671, filed Oct. 16, 2008, the disclosure of which is hereby incorporated by reference herein in its entirety.

TECHNICAL FIELD

The present invention relates to an apparatus for producing drinking water in which hydrogen molecules are dissolved (hereinafter, referred to as "hydrogen-dissolved drinking water"), and a method for producing such hydrogen-dissolved drinking water.

BACKGROUND ART

The human body utilizes the energy produced when breathed-in oxygen molecules ($O_2$) are reduced to water with a food-derived reducing substance by mitochondria. During this process, some of the oxygen molecules are converted into active oxygen ($O_2^-$). Active oxygen is an unstable substance that tends to act as a starting material in the production of hydroxyl radicals (OH.), which tend to be stabilized by taking an electron from the DNA of the human body. Hydroxyl radicals harm DNA, cause arteriosclerosis, contribute to the occurrence of cancer, and are a large factor in lifestyle-related diseases.

Recently, Professor Shigeo Ohta from the Institute of Gerontology, Nippon Medical School, reported in Non-Patent Document 1 that hydrogen molecules decrease active oxygen in the human body. A research team from Nippon Medical School performed an experiment on rat neurons grown in a test tube and confirmed that a solution with a hydrogen concentration of 1.2 ppm reduces and detoxifies active oxygen. Since hydrogen easily infiltrates even the interior of the cell nucleus, genes can also be expected to be protected from attack by active oxygen.

Therefore, technologies for producing water in which hydrogen molecules are dissolved efficiently and at a low cost are being focused on. Methods for producing water in which hydrogen molecules are dissolved can be broadly divided into the following two types.
(1) Dissolving hydrogen gas in water under high pressure.
(2) Producing hydrogen molecules directly in water by cathode electrolysis using an electrolytic cell.

Although the hydrogen gas dissolution method of (1) is simple, a pressure vessel for hazardous substances is required, the method is not easy-to-use, and the method is expensive. In addition, since hydrogen gas is a hazardous substance, the use of a hydrogen gas cylinder in the home would be difficult.

The electrolysis method of (2) holds promise for apparatuses for cheaply producing in the home water in which hydrogen molecules are dissolved. Conventionally, an alkaline ion water generator has often been used as an electrolysis apparatus for use in the home. Originally, alkaline ion water generators were designed to produce weakly alkaline water having a pH of 7 to 8.5 by electrolyzing tap water and the like in order to combat gastric hyperacidity. This type of apparatus includes, as shown in FIG. 18, a two-chamber electrolysis apparatus that divides an anode chamber 1 having an anode electrode 4 and a cathode chamber 6 having a cathode electrode 9 into two chambers by a diaphragm 5. The water to be treated is supplied from an anode chamber inlet 2 and a cathode chamber inlet 7 and electrolyzed by the anode electrode 4 and the cathode electrode 9. The electrolyzed water is discharged from an anode chamber outlet 3 and a cathode chamber outlet 8. In this case, since the diaphragm 5 and the electrodes (anode electrode 4 and cathode electrode 9) are separated, in order for electricity to flow an electrolyte needs to be included in the water supplied to the electrolytic cell. However, tap water contains 100 to 200 ppm of alkali metal ions such as sodium ions, and anions such as chloride ions. Consequently, for tap water in which sodium and chlorine are dissolved, the following reactions are possible.

Reactions at the Anode Electrode

$$2Cl^- - 2e^- \rightarrow Cl_2 \quad (1)$$

$$2H_2O - 4e^- \rightarrow O_2 + 4H^+ \quad (2)$$

Reactions at the Cathode Electrode

$$2Na^+ + 2e^- \rightarrow 2Na \quad (3)$$

$$2Na + 2H_2O \rightarrow 2Na^+ + H_2 + 2OH^- \quad (4)$$

$$2H_2O + 2e^- \rightarrow H_2 + 2OH^- \quad (5)$$

As can be seen from the above, alkaline water can be obtained in which hydrogen molecules are dissolved in cathode-electrolyzed water discharged from the cathode chamber 6. In order to use the produced electrolyzed water as drinking water, it is required under the Water Supply Act that the pH is 8.5 or less. When the two-chamber electrolytic cell illustrated in FIG. 18 is used, there is an increased chance that the pH will be 8.5 or more if strong electrolysis is carried out, so that the produced cathode-electrolyzed water will not be suitable as drinking water. Further, if the electrolysis current is reduced to try to lower the pH, the hydrogen molecule concentration will naturally decrease. Consequently, an effect from the hydrogen molecules cannot be expected. Thus, the conventional two-chamber electrolytic cell illustrated in FIG. 18 is not suited as a hydrogen-dissolved drinking water production apparatus.

One way to carry out strong electrolysis is to use pure water having a low conductivity. An example of an electrolytic cell for electrolyzing pure water having a low conductivity is the two-chamber electrolytic cell illustrated in FIG. 19 (constituent elements that are the same as those in FIG. 18 are denoted with the same reference numerals, and a description thereof is omitted here). In this case, the cathode electrode and the anode electrode are closely adhered to the diaphragm. To efficiently electrolyze the water, the cathode electrode and the anode electrode need to be formed like a net or punched metal, or be provided with many through holes so that water can permeate therethrough (hereinafter, this is referred to as "water-permeable"; in FIG. 19, the water-permeable anode electrode is represented by reference numeral 4-1, and the water-permeable cathode electrode is represented by reference numeral 9-1). In addition, using a fluorine-based cation exchange membrane as the diaphragm enables pure water to be electrolyzed at a low voltage (in FIG. 19, the diaphragm formed from a fluorine-based cation exchange membrane is represented by reference numeral 5-1). Since pure water is electrolyzed, basically there is no change in the pH of the cathode-electrolyzed water, so that the electrolysis current can be increased. Further, when electrolyzing ultrapure water having an alkali metal ion concentration of ppt or less, since basically no large change is seen in the pH of the cathode-electrolyzed water, the electrolysis current can be increased.

However, in the case of a low-cost electrolysis apparatus for home use, tap water purity will probably be less than that of ultrapure water, and thus the alkali metal ion concentration would be expected to be several ppm.

The produced hydrogen molecule amount is proportional to the electrolysis current. When the cathode-electrolyzed water is provided as drinking water, how the hydrogen molecules are present in the water is important. To be suitably absorbed into the human body, the hydrogen molecules need to be dissolved in water. The produced hydrogen molecules can broadly be classified as hydrogen gas in the form of bubbles and dissolved hydrogen molecules. The hydrogen gas in the form of bubbles quickly evaporates into the air, which reduces the proportion that is absorbed into the human body. The dissolved hydrogen molecules are present in the water as single molecules, a plurality of molecules and the like. In such a state, the life of the dissolved hydrogen molecules increases, and the chances of absorption into the human body improve.

When electrodes having the same external dimensions are used, it can be thought that to increase the produced hydrogen concentration in the cathode-electrolyzed water, the hydrogen production amount needs to be increased by increasing the current density. However, it has been reported that the efficiency of the produced hydrogen molecules dissolving in the cathode-electrolyzed water depends on the current density and the flow rate on the electrode surface. It is known that dissolution efficiency decreases as current density increases. Therefore, an optimum current density exists. Moreover, it is known that the dissolution efficiency depends on the flow rate on the electrode surface, and that the dissolution efficiency is larger, the faster the flow rate is. However, because the amount of the cathode-electrolyzed water increases if the flow rate is increased, a larger dissolution efficiency does not always mean that the dissolved hydrogen molecule concentration will increase. More specifically, an optimum flow rate also exists.

Based on the above standpoint, when high-purity water such as pure water is used, a two-chamber electrolytic cell like that illustrated in FIG. 19, in which the anode electrode and the cathode electrode are closely adhered to the fluorine-based ion exchange membrane 5-1, is suitable. However, in this case, to dissolve the electrolysis product in the electrolyzed water, both the anode electrode and the cathode electrode need to be water-permeable, and closely adhered to the fluorine-based ion exchange membrane diaphragm. Using a water-permeable electrode means that the effective surface area is reduced, so that the effective current density is increased. This means that the optimum current for a water-permeable electrode is smaller than the optimum current for a cathode electrode having the same dimensions without holes. Further, since the water-permeable electrode needs to be closely adhered to the diaphragm, electrolysis occurs at the edge portions of the holes in the water-permeable electrode. Consequently, the effective surface area for electrolysis is further reduced. Thus, compared with an electrolytic cell having the same dimensions, the produced amount of dissolved hydrogen molecules for an electrolytic cell provided with a water-permeable electrode is reduced. Therefore, to reduce costs, a structure that uses an electrode having a small hole surface area and that has a small contact area with the diaphragm is preferred.

[Non-Patent Document 1] Nature Medicine Electronic Version 2007 May 8 (Published online: 7 May 2007; doi: 10.1038/nm1577)

DISCLOSURE OF THE INVENTION

Problems to be Solved by the Invention

As described above, currently, there are no suitable apparatuses for producing hydrogen-dissolved drinking water for the home.

It is an object of the present invention to provide an apparatus for producing in the home hydrogen-dissolved drinking water that is suitable for drinking, has a high dissolved hydrogen concentration, and a long dissolved hydrogen concentration life.

Means for Solving the Problems

As a result of continued diligent research to resolve the above-described problems, the present invention was completed.

More specifically, the present invention is directed to a hydrogen-dissolved drinking water production apparatus comprising an electrolytic cell through which water can pass for producing drinking water having a pH in a range of 2.5 to 8.5, and in particular, in a range of 5.8 to 8.5, and a dissolved hydrogen concentration of 0.1 ppm or more by supplying high-purity water having a conductivity of 50 μS/cm or less. The hydrogen-dissolved drinking water production apparatus is characterized in that the electrolytic cell comprises a vertical anode chamber having a water-permeable plate-like anode electrode and a vertical cathode chamber having a plate-like cathode electrode, the anode chamber and the cathode chamber are separated by a diaphragm formed from a fluorine-based cation exchange membrane, the water-permeable plate-like anode electrode is closely adhered to the diaphragm formed from the fluorine-based cation exchange membrane, and an ion-exchange resin is filled in a space between the diaphragm and the cathode electrode.

Advantages of the Invention

According to the present invention, an apparatus for producing hydrogen-dissolved drinking water that is suitable for drinking, has a high dissolved hydrogen concentration, and has a long dissolved hydrogen concentration life can be provided.

BRIEF DESCRIPTION OF THE DRAWINGS

FIGS. 2a and 2b are schematic diagrams illustrating a potential gradient resulting from differences between the ion-exchange resin membranes used as a diaphragm, in which FIG. 2a is a schematic diagram illustrating the potential gradient when the ion-exchange membrane used as the diaphragm is not a fluorine-based cation exchange membrane, and FIG. 2b is a schematic diagram illustrating the potential gradient when a fluorine-based cation exchange membrane is used as the diaphragm.

Figure 1:
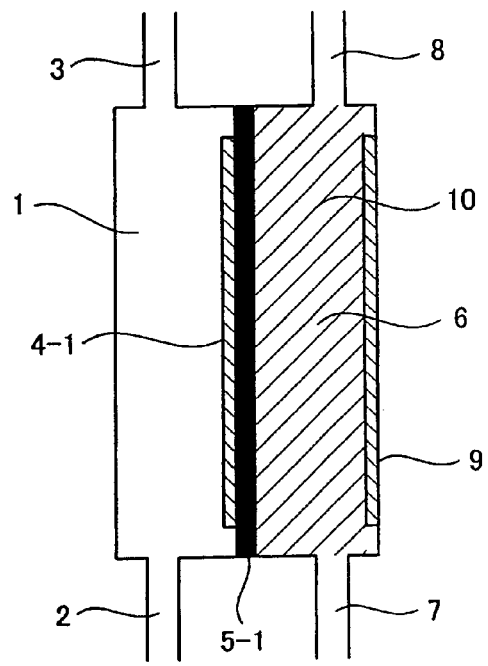
FIG. 1 is a schematic cross sectional diagram of a two-chamber electrolytic cell used in the hydrogen-dissolved drinking water production apparatus according to the present invention.

DESCRIPTION OF REFERENCE NUMERALS 1 anode chamber
2 anode chamber inlet
3 anode chamber outlet
4 anode electrode
4-1 water-permeable anode electrode diaphragm
5-1 diaphragm formed from fluorine-based cation exchange membrane
6 cathode chamber
7 cathode chamber inlet
8 cathode chamber outlet
9 cathode electrode
9-1 water-permeable cathode electrode
10 ion-exchange resin
11 pre-filter
12 pre-carbon filter
13 reverse osmosis membrane filter
14 precision carbon filter
15 tap water line
16 flow sensor
17 chilling hydrogen water tank
18 hydrogen water valve
19 drain line
20 air filter
21 hydrogen water reservoir tank
22 warm hydrogen water tank
23 warm water valve
24 UV-ray lamp
25 middle chamber
26 middle chamber inlet
27 middle chamber outlet
28 ion-exchange resin
29 attachment aperture
30 through hole
31 flow sensor
32 three-way valve
33 circulation pump
34 precision filter
35 ion-exchange resin column
36 hot water reservoir tank
36-1 hot water tank
36-2 hot water valve
37 deaeration unit
38 middle chamber solution circulation pump
39 middle chamber solution tank

BEST MODE FOR CARRYING OUT THE INVENTION

The hydrogen-dissolved drinking water production apparatus according to the present invention will now be described based on the drawings.

An example of an electrolytic cell that can be used in the apparatus described in the first aspect of the present application for producing drinking water having a pH in the range of 2.5 to 8.5, in particular in the range of 5.8 to 8.5, and a dissolved hydrogen concentration of 0.1 ppm or more, obtained by treating the high-purity water having a conductivity of 50 μS/cm or less is illustrated in FIG. 1 as a schematic cross sectional diagram.

The electrolytic cell of the present invention illustrated in FIG. 1 is composed of a vertical anode chamber (1) having a water-permeable plate-like anode electrode (4-1), and a vertical cathode chamber (6) having a plate-like cathode electrode (9). This electrolytic cell is a two-chamber electrolytic cell through which water can pass, in which the anode chamber and the cathode chamber include respective inlets (2 and 7) that allow raw water to flow in and respective outlet (3 and 8) that allow electrolyzed water (hereinafter sometimes referred to as "hydrogen water" or "produced water") to flow out. The anode chamber (1) and the cathode chamber (6) are separated by a diaphragm (5-1) formed from a fluorine-based cation exchange membrane. The water-permeable plate-like anode electrode (4-1) is closely adhered to the diaphragm formed from a fluorine-based cation exchange membrane. An ion-exchange resin (10) is filled in the space between the diaphragm (5-1) and the cathode electrode (9).

Figure 9:
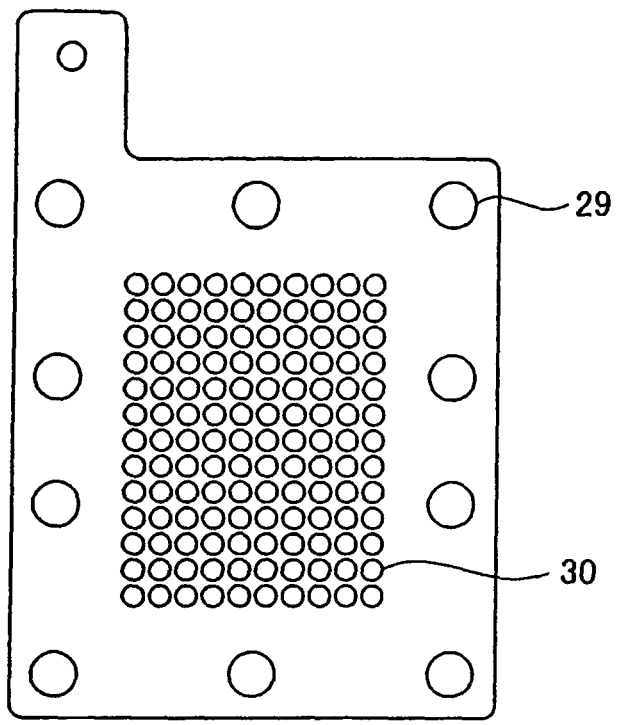
FIG. 9 is a planar diagram of a porous electrode.

The electrolytic cell is divided into two chambers, the anode chamber 1 and the cathode chamber 6, by the diaphragm 5-1 formed from a fluorine-based cation exchange membrane. The anode electrode is permeable to water, and closely adhered to the diaphragm 5-1 (in FIG. 1, the water-permeable anode electrode is represented by reference numeral 4-1). The electrode may be made to be water-permeable by employing a net-like or a punched metal electrode, or by providing a plurality of through holes in a plate-like electrode as illustrated in FIG. 9. The cathode electrode 9 is closely adhered to the cathode wall surface facing the diaphragm 5-1. An ion-exchange resin through which water can pass is filled in the space between the cathode electrode 9 and the diaphragm 5-1.

The fluorine-based cation exchange membrane is a fluoropolymer ion-exchange membrane in which sulfonic acid groups are bonded to a membrane mainly formed from a polytetrafluoroethylene structure.

Using a fluorine-based cation exchange membrane as the diaphragm is known to enable pure water to be electrolyzed at a low voltage of several tens of volts or less. This is because the hydrogen ions ($H^+$) bonded to the sulfate groups, which serve as the ion-exchange groups in a fluororesin environment, tend to be released in the fluorine-based cation exchange membrane. Consequently, the hydrogen ions turn into carriers, and contribute to an improvement in conductivity. As a result, pure water can be electrolyzed at a low voltage. Further, it is known that the hydrolysis of water molecules ($H_2O$) is promoted in the strong electric field near the ion-exchange groups bonded to a strong cation exchange resin and a strong anion exchange resin as follows.

$$H_2O \rightarrow H^+ + OH^- \quad (5)$$

Consequently, carriers are produced even if ultrapure water is electrolyzed. Therefore, electrolysis can continue in a stable manner. Here, if there is a gap between the anode electrode and the diaphragm, the voltage drop over this gap increases. Since electrolysis does not proceed at a low voltage of ten and several volts, the electrode needs to be closely adhered to the diaphragm. Accordingly, the anode electrode has to be closely adhered to the diaphragm.

However, if there is no gap between the cathode electrode and the diaphragm, water cannot pass through to the surface of the cathode electrode. Moreover, if a distance is provided between the cathode electrode and the diaphragm, the voltage drop over this portion increases, and electrolysis at a low voltage becomes impossible. Therefore, an ion-exchange resin is filled therebetween so that the hydrogen ions, which serve as carriers and which were produced by the anode electrode and the fluorine-based cation exchange membrane, can easily move.

Figure 2:
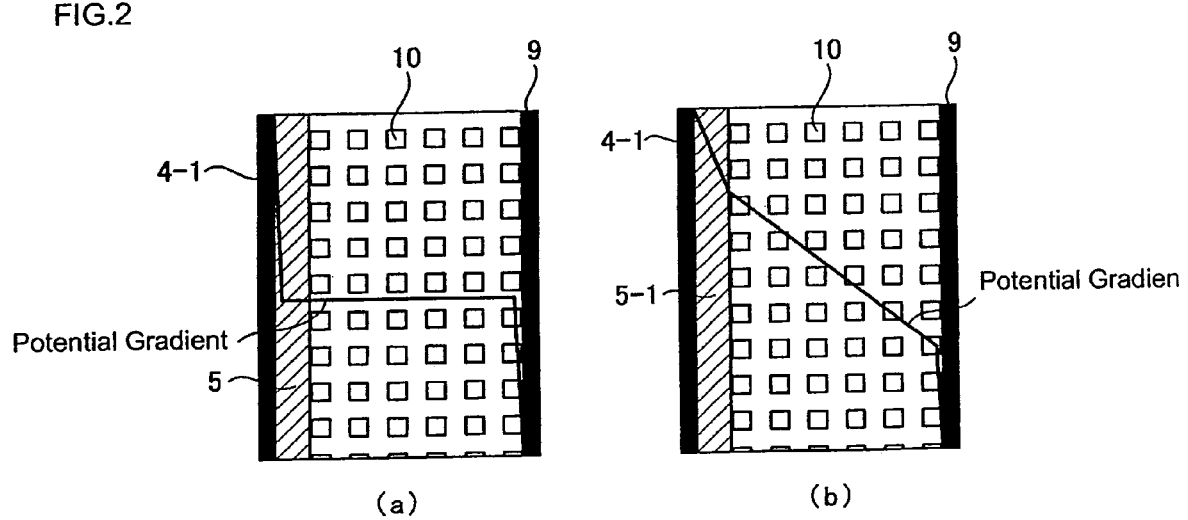

An external electric field between the anode electrode and the cathode electrode produced by the hydrogen ions supplied from the fluorine-based cation exchange membrane enters the ion-exchange resin layer. FIG. 2 schematically illustrates potential gradients. When a typical non-fluorine-based ion-exchange membrane made from polypropylene or vinyl chloride is used, in which ion-exchange groups are bonded to a resin, as illustrated in FIG. 2a, the potential gradient is limited by the electrode surface area, and the potential gradient decreases at the ion-exchange resin phase. However, when a fluorine-based cation exchange membrane is used as the diaphragm, since carriers are supplied, as illustrated in FIG. 2b, the potential gradient encroaches as far as the ion-exchange resin phase. Consequently, an electric field is applied on the ion-exchange groups bonded to the ion-exchange resin, which promotes the hydrolysis of water so that carriers are produced, thereby enabling electrolysis at a low voltage.

By using an electrolytic cell like that illustrated in FIG. 1 having the structure according to the present invention, the front face of the cathode electrode can be used, thereby enabling the produced amount of dissolved hydrogen molecules to be increased and costs to be decreased.

Figure 3:
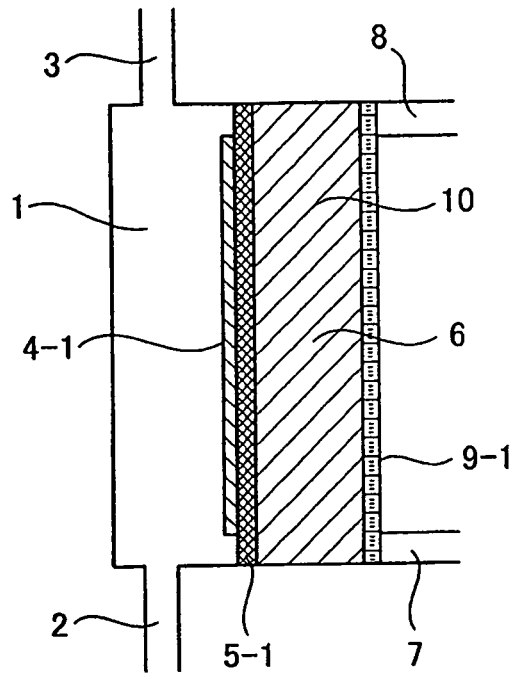
FIG. 3 is a schematic cross sectional diagram of a two-chamber electrolytic cell used in the hydrogen-dissolved drinking water production apparatus according to the present invention.

The electrolytic cell illustrated in FIG. 3 is a modified example of the electrolytic cell of FIG. 1. The electrolytic cell illustrated in FIG. 3 is arranged so that the cathode chamber inlet 7 and the cathode chamber outlet 8 are arranged orthogonally to the cathode electrode in order that the raw water may be supplied via the cathode electrode and the electrolyzed water may be discharged via the cathode electrode. In a two-chamber electrolytic cell, the cathode chamber thickness needs to be narrow in order to reduce the electrolysis voltage. However, a narrow thickness has the drawback of making it more difficult to provide the cathode chamber inlet and outlet. In such a case, by using the electrolytic cell with the structure illustrated in FIG. 3, the cathode chamber thickness can be narrowed and the inlet and outlet can be easily provided.

Further, for the electrolytic cell illustrated in FIG. 3, the cathode electrode needs to be water-permeable in order to supply the raw water and discharge the electrolyzed water (in FIG. 3, the water-permeable cathode electrode is represented by reference numeral 9-1).

One of the drawbacks of the electrolytic cells illustrated in FIGS. 1 and 3 is that if the flow rate is increased, some of the carriers are removed by the supplied raw water, so that the electrolysis current decreases. In this case, to supply an even larger amount of raw water to the cathode chamber, ultimately it is preferred to perform electrolysis by rerouting a part of the cathode chamber supply water using an electrolytic cell with a structure like that illustrated in FIG. 4.

Figure 4:
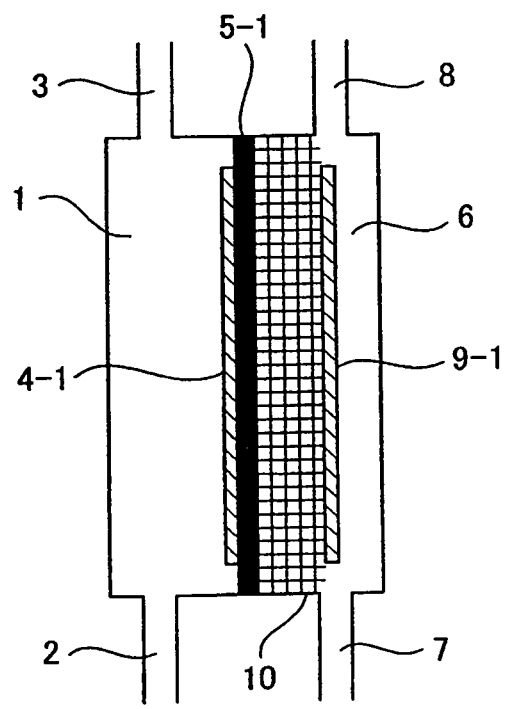
FIG. 4 is a schematic cross sectional diagram of a two-chamber electrolytic cell used in the hydrogen-dissolved drinking water production apparatus according to the present invention.

The electrolytic cell of FIG. 4 is characterized in that, in the electrolytic cell described in the first aspect of the present application, the cathode electrode is arranged so that a space can be formed between the face that is not in contact with the ion-exchange resin and the cathode chamber wall face, and the cathode electrode is water-permeable.

By configuring the electrolytic cell with the structure illustrated in FIG. 4, the raw water supplied to the cathode chamber 6 flows to both the front face of the anode electrode side of the cathode electrode and the rear face thereof. By employing such a configuration, a part of the raw water supplied from the cathode chamber inlet 7 flows through the filled layer of the ion-exchange resin 10, and a part of the raw water flows without passing through the filled layer of the ion-exchange resin 10. To reroute the raw water, the raw water is supplied to the surface side of the cathode electrode by making the cathode electrode water-permeable (in FIG. 4, the water-permeable cathode electrode is represented by reference numeral 9-1).

Figure 5:
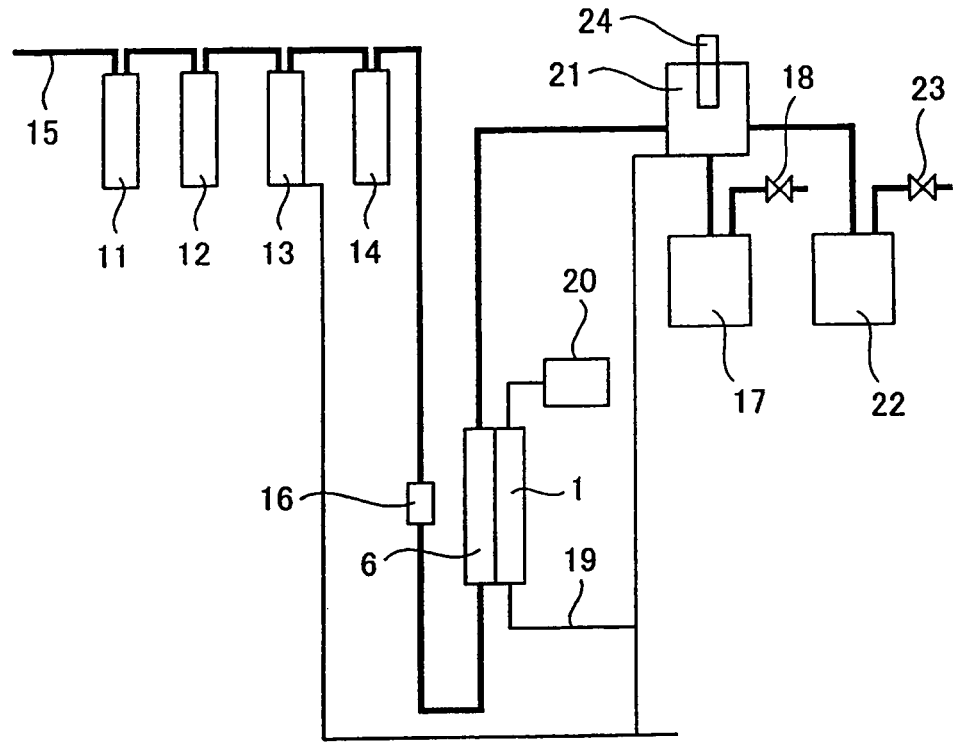
FIG. 5 is a system flow diagram of the hydrogen-dissolved drinking water production apparatus according to the present invention provided with a tap water purification system.

To carry out strong electrolysis, high-purity water having a conductivity of 50 µS/cm or less needs to be used for the raw water supplied to the electrolytic cells illustrated in FIGS. 1, 3, and 4. Accordingly, if tap water is used for the raw water, impurity ions dissolved in the tap water have to be removed with a filter system. An example of a hydrogen-dissolved drinking water production apparatus provided with a filter system is illustrated in FIG. 5. Removing impurity ions allows the pH of the cathode-electrolyzed water to be prevented from becoming excessively alkaline. Examples of the filter system for removing impurity ions include a pre-filter formed from a string-wound filter, a precision filter, an active carbon filter, or a combination of these.

As illustrated in FIG. 5, the tap water is supplied from a tap water line 15. The tap water flows through a pre-filter 11, a pre-carbon filter 12, and a precision carbon filter 14 to remove impurity ions dissolved in the tap water, thereby producing high-purity water having a conductivity of 50 µS/cm or less. The high-purity water is supplied to the cathode chamber 6 of the two-chamber electrolytic cell according to the present invention while measuring the flow rate with a flow sensor 16. The water electrolyzed in the cathode chamber 6 is discharged as hydrogen-dissolved drinking water, and stored in a hydrogen water reservoir tank 21. To prevent the propagation of bacteria in the stored hydrogen-dissolved drinking water, it is preferred to provide sterilization means, such as a UV-ray lamp 24, in the hydrogen water reservoir tank 21. The hydrogen-dissolved drinking water stored in the hydrogen water reservoir tank 21 may be used for drinking as is. Alternatively, if chilled hydrogen water is desired, the hydrogen-dissolved drinking water may be stored and chilled in a chilling hydrogen water tank 17 (chilling means not illustrated), and then the chilled hydrogen water may be supplied via a hydrogen water valve 18. If warm hydrogen water is desired, the hydrogen-dissolved drinking water may be stored and heated in a warm hydrogen water tank 22 (heating means not illustrated), and then the heated hydrogen water may be supplied via a warm water valve 23.

Further, by providing an ion-exchange resin column, contamination of the cathode electrode from calcium ions and magnesium ions can be prevented. A reverse osmosis membrane filter 13 may be used instead of an ion-exchange resin column.

Figure 6:
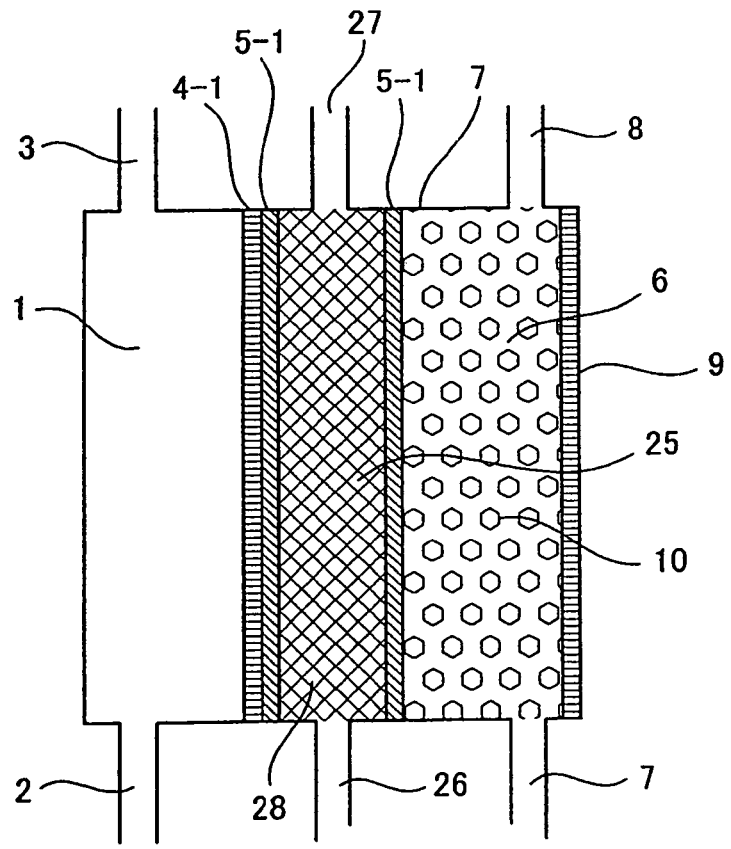
FIG. 6 is a schematic cross sectional diagram of a three-chamber electrolytic cell used in the hydrogen-dissolved drinking water production apparatus according to the present invention.

Using a reverse osmosis membrane filter substantially reduces the alkali metal and alkali earth metal ion concentration, so that the chances of the pH of the cathode-electrolyzed water becoming alkaline are reduced. However, in hard water regions such as China, Europe, and central parts of the USA, the performance of a reverse osmosis membrane filter drops. Thus, in regions where the performance of a reverse osmosis membrane filter drops, it is effective to supply an aqueous solution of an organic acid to an middle chamber using a hydrogen-dissolved drinking water production apparatus provided with a three-chamber electrolytic cell formed from an anode chamber 1, an middle chamber 25, and a cathode chamber 6, as illustrated in FIG. 6. The three-chamber electrolytic cell illustrated in FIG. 6 has the middle chamber 25 between the anode chamber 1 and the cathode chamber 6. The anode chamber 1 and the intermediate chamber 25, and the cathode chamber 6 and the middle chamber 25, are divided by a diaphragm 5-1 formed from a fluorine-based cation exchange membrane. The middle chamber 25 is filled with an ion-exchange resin 28.

If the aqueous solution of an organic acid filled in the middle chamber has a small degree of disassociation or a low concentration, and if the conductivity is low, the electrolysis voltage has to be increased. In such a case, a structure that is filled with an ion-exchange resin so that electrolysis is generally possible even for pure water is used. However, an ion-exchange resin is not filled if the concentration of the aqueous solution of an organic acid is high.

By supplying an aqueous solution of an organic acid to the middle chamber 25, hydrogen ions that were released in the middle chamber solution move to the cathode chamber 6, thereby allowing the pH of the cathode-electrolyzed water to be prevented from becoming alkaline. The organic acid is preferably selected from among food additives. Examples thereof include lactic acid, ascorbic acid, citric acid, malic acid, gluconic acid, and acetic acid.

In the hydrogen-dissolved drinking water production apparatus according to the present invention, to increase the dissolved hydrogen molecule concentration in the cathode water, and to electrolyze by circulating the hydrogen water produced by cathode electrolysis, it is preferred to provide a circulation line that has a tank for the produced water and a circulation pump.

In the hydrogen-dissolved drinking water production apparatus according to the present invention, to improve the dissolved hydrogen concentration of the produced water, it is preferred to provide deaeration means prior to the electrolytic cell to reduce the concentration of dissolved air in the high-purity water. As the deaeration means, for example, a deaeration unit using a hollow fiber membrane method may be used. In this method, water is passed through a hollow fiber membrane to evacuate air surrounding the hollow fiber membrane.

Example 1

Figure 19:
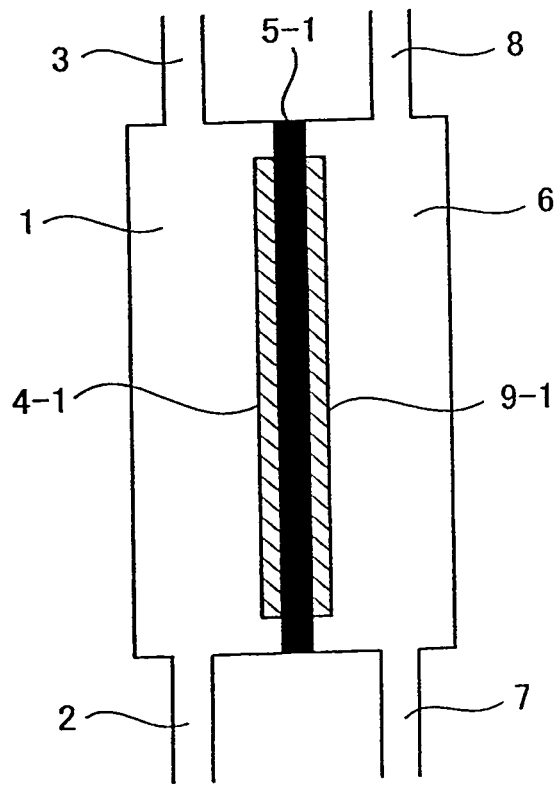
FIG. 19 is a schematic cross sectional diagram of a conventional two-chamber electrolytic cell.

The relationship among the pH of cathode-electrolyzed water, the structure of the conventional electrolytic cell illustrated in FIG. 19, and the structure of the electrolytic cell according to the present invention illustrated in FIG. 1 was confirmed. The dimensions of the electrodes in the electrolytic cells were 8 cm×6 cm. A fluorine-based cation exchange membrane was used for the diaphragm. A platinum-plated titanium plate was used for the electrodes. However, a water-permeable electrode provided with a plurality of through holes (3 mm $\phi$) as illustrated in FIG. 9 was used for the anode electrode in the electrolytic cell of FIG. 1. In addition, for the electrolytic cell illustrated in FIG. 1, a cation exchange resin 10 was filled between a diaphragm 5-1 formed from a fluorine-based cation exchange membrane manufactured by Dupont and the cathode electrode to a thickness of 5 mm. As the raw water, water obtained by treating tap water using a reverse osmosis membrane filter was used (conductivity: 4 $\mu$S/cm).

Figure 18:
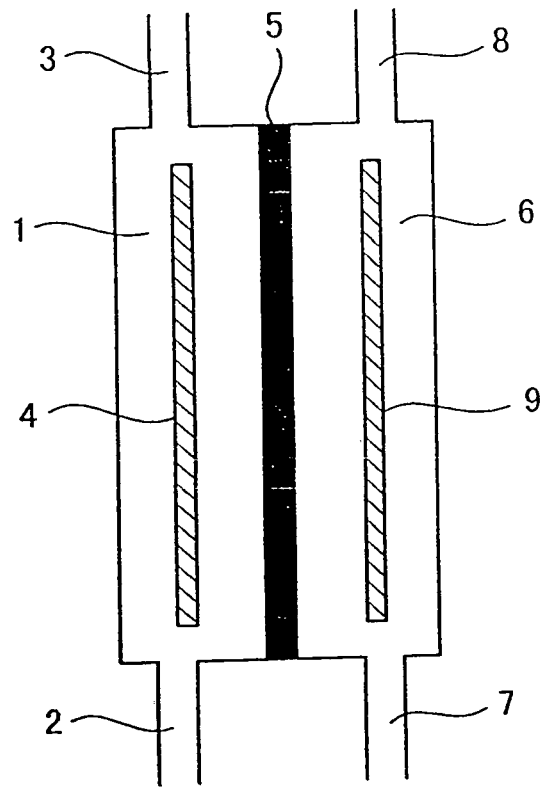
FIG. 18 is a schematic cross sectional diagram of a conventional two-chamber electrolytic cell.

However, for the conventional two-chamber electrolytic cell illustrated in FIG. 18, since electrolysis is impossible without an electrolyte, 0.2% of table salt was added to the raw water. The flow rate was set at 0.5 L/min, and the electrolysis current was set at 5 A. The pH of the produced cathode-electrolyzed water for the conventional two-chamber electrolytic cell illustrated in FIG. 18 was measured to be 10.6. However, the pH of the cathode-electrolyzed water for the electrolytic cell of FIG. 1 according to the present invention was measured to be a neutral 6.8, which satisfied the standards for drinking water.

Example 2

In the electrolytic cell having the structure illustrated in FIG. 1, a water-permeable anode electrode provided with a plurality of through holes (3 mm $\phi$) as illustrated in FIG. 9 and a cathode electrode were used. These electrodes had dimensions of 8 cm×6 cm and an electrode surface area of 48 cm². The cathode electrode was a flat plate made from platinum-plated titanium that did not have through holes. A fluorine-based cation exchange membrane manufactured by Dupont was used as the diaphragm. A cation exchange resin was filled between the diaphragm and the cathode electrode. The thickness of the ion-exchange resin layer was 5 mm. The cathode-electrolyzed water was passed through a 0.1 micron filter to separate the water into hydrogen molecules in the form of macroscopic gas bubbles (GH) and hydrogen molecules dissolved in particulate form (SH). SH+GH is the total hydrogen amount produced by electrolysis converted from the current. The current was varied between 0.2 and 9.5 A. The water supplied to the cathode electrolysis chamber was pure water of about 1 $\mu$S/cm, and the flow rate was 0.5 mL/min. The pH of the cathode-electrolyzed water was 6.0 to 6.8. Further, test results concerning the dissolved hydrogen are shown in FIG. 7.

Figure 7:
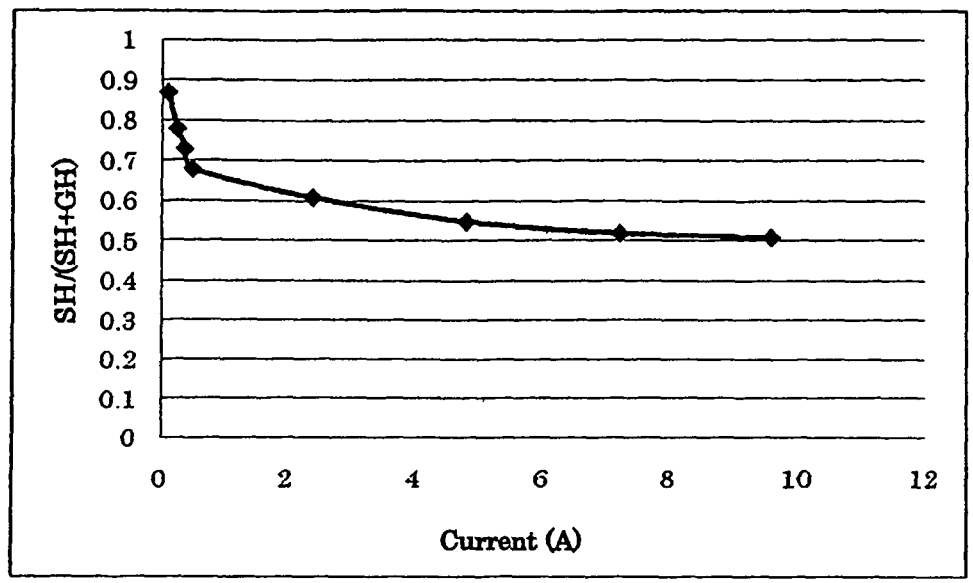
FIG. 7 is a graph illustrating a relationship between the ratio of the amount of dissolved hydrogen and current in Example 2.

From FIG. 7, it can clearly be seen that if the current density is increased, the ratio of the dissolved component SH among the produced hydrogen molecules decreases.

Example 3

Figure 8:
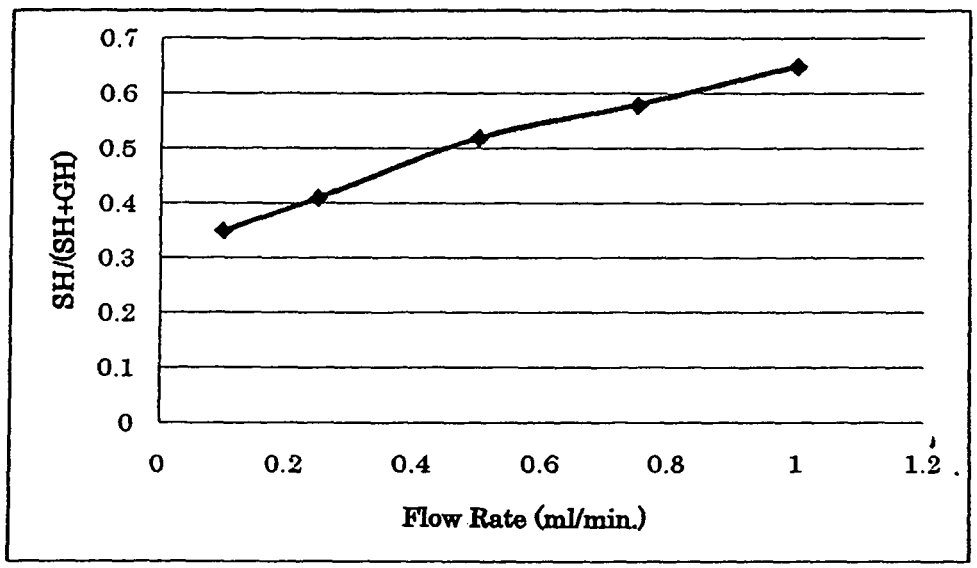
FIG. 8 is a graph illustrating a relationship between the ratio of the amount of dissolved hydrogen and flow rate in Example 3.

Using the same electrolytic cell as in Example 2, the flow rate in the cathode electrode chamber and the change in concentration of the dissolved hydrogen molecules were measured. The current was set at 5 A. The water supplied to the cathode electrolysis chamber was pure water of about 1 µS/cm. The effects of flow rate on the ratio (SH/(SH+GH)) between the hydrogen molecule concentration (SH+GH) converted from the current value and the dissolved hydrogen molecule concentration (SH) in the cathode-electrolyzed water passed through a 0.1 micron filter were plotted. The pH of the cathode-electrolyzed water at this time was 6.1 to 6.7. Measurement data concerning the dissolved hydrogen are shown in FIG. 8. From FIG. 8, it can clearly be seen that if the flow rate is increased, the ratio of the dissolved hydrogen concentration increases. However, although the electrolysis voltage was about 9V when the flow rate was 0.1 L/min, the electrolysis voltage was 58V when the flow rate was 1 L/min. Thus, it can be seen that the electrolysis voltage increases along with the flow rate.

Example 4

Next, an electrolytic cell having the structure of FIG. 19, and electrolytic cells having the structures illustrated in FIGS. 1 and 4 were compared regarding the dissolved hydrogen molecule concentration. For the electrolytic cell illustrated in FIG. 19, water-permeable electrodes were used for the anode and the cathode electrodes. For the electrolytic cell illustrated in FIG. 4, the cathode electrode was water-permeable. For the electrolytic cell illustrated in FIG. 1, a cathode electrode formed from a plate without holes was used. For the electrolytic cells illustrated in FIGS. 1 and 4, a fluorine-based cation exchange resin (product name: NR50, manufactured by Kabushiki Kaisha DuPont) was used for the ion-exchange resin filled in the cathode chamber. FIG. 9 illustrates an embodiment of the water-permeable anode or cathode electrode. More specifically, a plate-like electrode is provided with through holes 30, with an attachment aperture 29 opened thereon.

The supplied water had a conductivity of 4 µS/cm. The electrolysis current was set at 10 A, and the flow rate was set at 0.5 mL/min. The pH of the cathode-electrolyzed water when the electrolytic cell of FIG. 19 was used was around 8.8. The pH of the cathode-electrolyzed water when the electrolytic cells of FIGS. 1 and 4 were used was 6.5 to 7.2.

Figure 10:
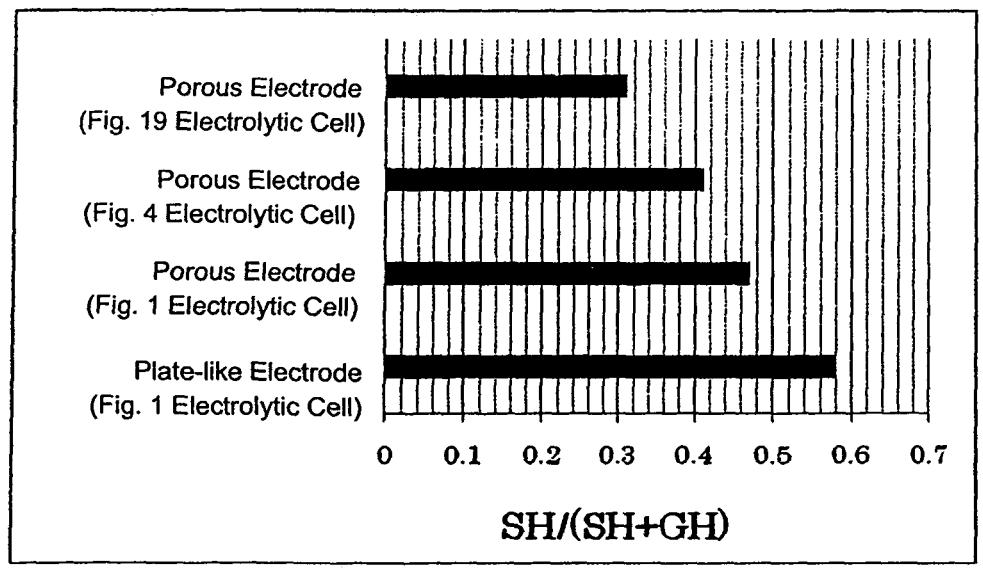
FIG. 10 is a graph illustrating a relationship between the structure of the electrolytic cell and the ratio of the amount of dissolved hydrogen in Example 4.

The results are shown in FIG. 10. From FIG. 10, it is clear that the dissolved hydrogen molecule concentration ratio is higher for a plate-like cathode electrode than for a water-permeable cathode electrode. Further, it can also be seen that the structure of the electrolytic cell according to the present invention is more preferred than that illustrated in FIG. 19 even when a water-permeable cathode electrode is used.

Example 5

Figure 11:
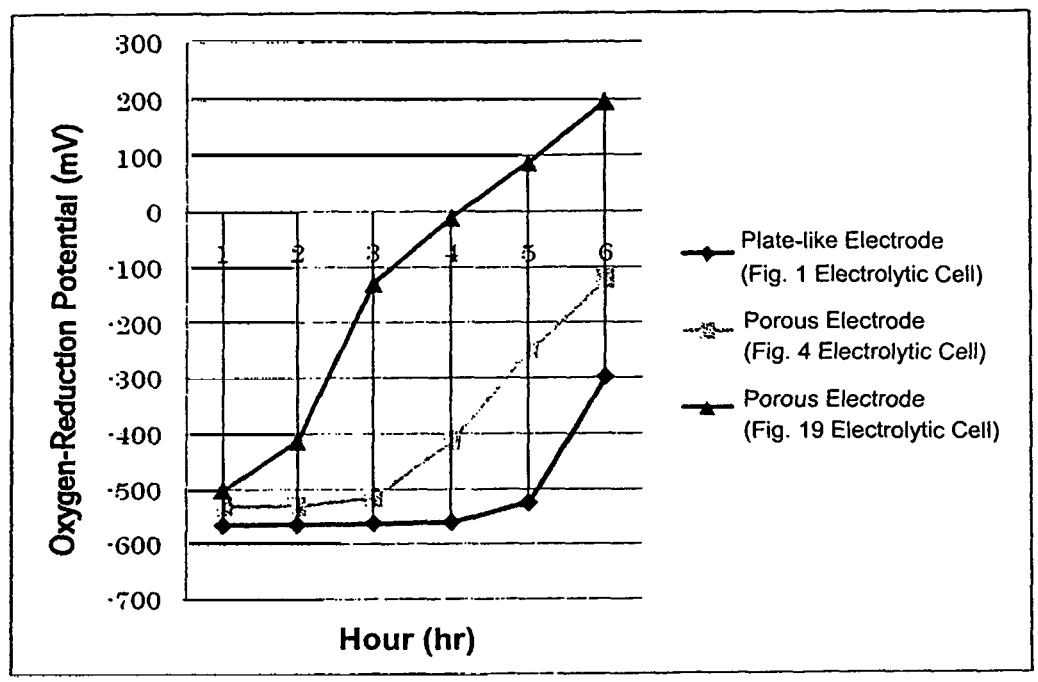
FIG. 11 is a graph illustrating a relationship between oxidation-reduction potential and time based on differences in the structure of the electrolytic cell in Example 5.

The life of hydrogen-dissolved water concentrations produced using electrolytic cells having the structure of FIGS. 1, 3, and 19 which were provided with the water-permeable electrode illustrated in FIG. 9 was investigated. As the raw water, water obtained by treating tap water using a reverse osmosis membrane filter was used (conductivity: 4 µS/cm). The flow rate was set at 0.5 L/min, and the electrolysis current was set at 10 A. The life of dissolved hydrogen concentrations was measured based on changes in the ORP (oxidation-reduction potential when platinum is used as a test electrode) of the cathode-electrolyzed water. The less the change over time in the ORP, the longer the life of the dissolved hydrogen concentration. The change over time in ORP is shown in FIG. 11. From FIG. 11, it can clearly be seen that the life of the hydrogen-dissolved water produced by the electrolytic cell according to the present invention having the structure of FIG. 1 is the longest, thus showing the effectiveness of the present invention compared with the conventional two-chamber electrolytic cell illustrated in FIG. 19. The pH of the cathode-electrolyzed water when the electrolytic cell of FIG. 19 was used was around 8.8. Further, the pH of the cathode-electrolyzed water when the electrolytic cells of FIGS. 1 and 4 were used was 6.5 to 7.2.

Example 6

Next, the effects on dissolved hydrogen concentration when raw water was deaerated using an electrolytic cell having the structure illustrated in FIG. 1 used in Example 1 were confirmed. The raw water was obtained by treating tap water using a reverse osmosis membrane filter (conductivity: 4 µS/cm), and then passing the treated water through a deaeration unit that used a membrane method. As a result of this treatment, the dissolved oxygen concentration decreased from 8 ppm to 5 ppm. The flow rate was set at 1 L/min, and the electrolysis current was set at 10 A. Deaeration effects were evaluated based on the ORP of the cathode-electrolyzed water. When non-deaerated raw water was used, the ORP was 525 mV. However, when deaerated water was used, the ORP was 570 mV. Thus, the deaeration treatment was effective in increasing the dissolved hydrogen concentration. The pH of the cathode-electrolyzed water at this stage was around 6.4.

Example 7

Although pure water was used in the above examples, in this example tap water was used as the raw water. As the apparatus, the hydrogen-dissolved drinking water production apparatus illustrated in FIG. 5 was used. The raw water treatment was carried out using a pre-filter 11, a pre-carbon filter 12, and a precision carbon filter 14 upstream of the electrolytic cell. In addition, to suppress the pH from becoming more alkaline due to cathode electrolysis, a reverse osmosis membrane filter 13 was used. The thus-treated raw water was supplied to the two-chamber electrolytic cell illustrated in FIG. 1.

Example 8

Figure 12:
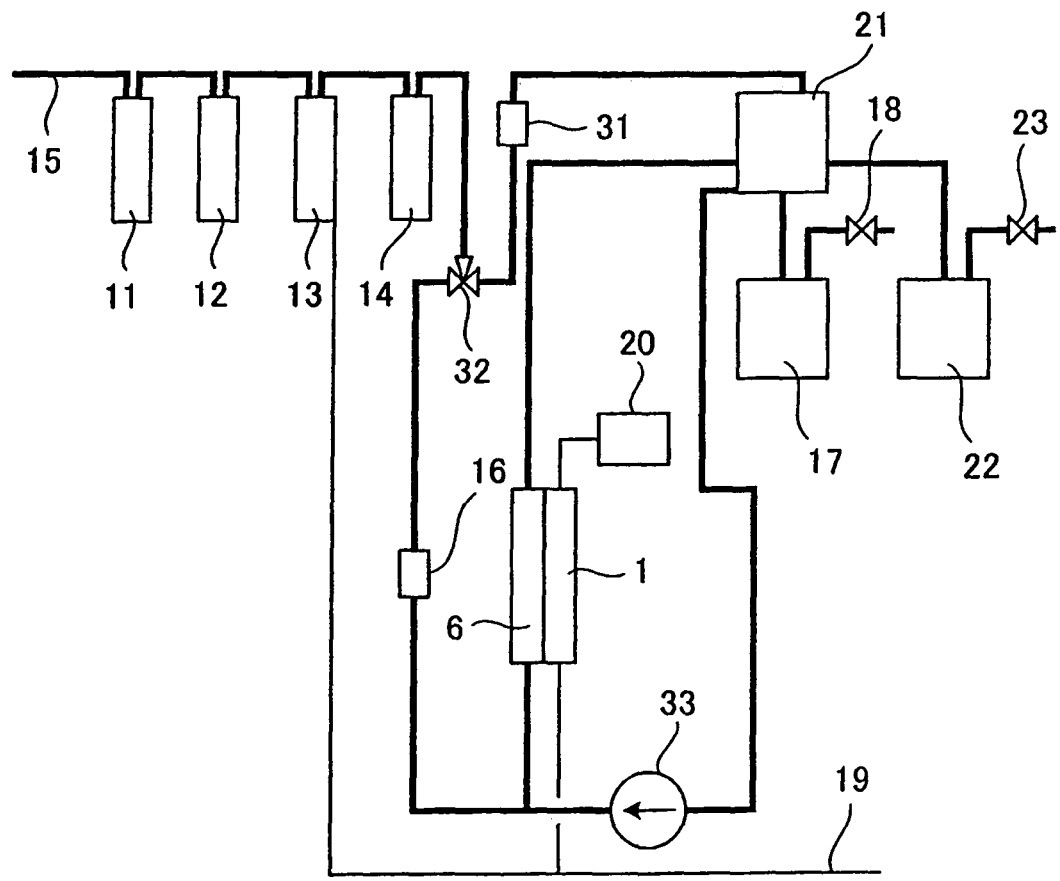
FIG. 12 is a system flow diagram of a hydrogen-dissolved drinking water production apparatus provided with a circulation line.

The present example used tap water as the raw water, and a compact hydrogen-dissolved drinking water production apparatus for home or office use in order to supply the hydrogen water for drinking. A flow diagram of this system is illustrated in FIG. 12. The tap water was supplied from a tap water line 15, then flowed through a pre-filter 11, a pre-carbon filter 12, a reverse osmosis membrane filter 13, and a precision carbon filter 14 to remove impurity ions dissolved in the tap water, thereby producing high-purity water having a conductivity of 5 µS/cm. The high-purity water was supplied to the cathode chamber 6 of the two-chamber electrolytic cell according to the present invention while measuring the flow rate with a flow sensor 16. The water electrolyzed in the cathode chamber 6 was discharged as hydrogen-dissolved drinking water, and stored in a hydrogen water reservoir tank 21.

In this apparatus, water treated by filtering is stored in the hydrogen water reservoir tank 21, and then the hydrogen water is circulated back to the cathode chamber 6 by a circulation pump 33 to increase the dissolved hydrogen concentration. The hydrogen-dissolved water is transferred to a chilling hydrogen water tank 17 or a warm hydrogen water tank so that chilled hydrogen water or warm hydrogen water can be supplied.

Example 9

Figure 13:
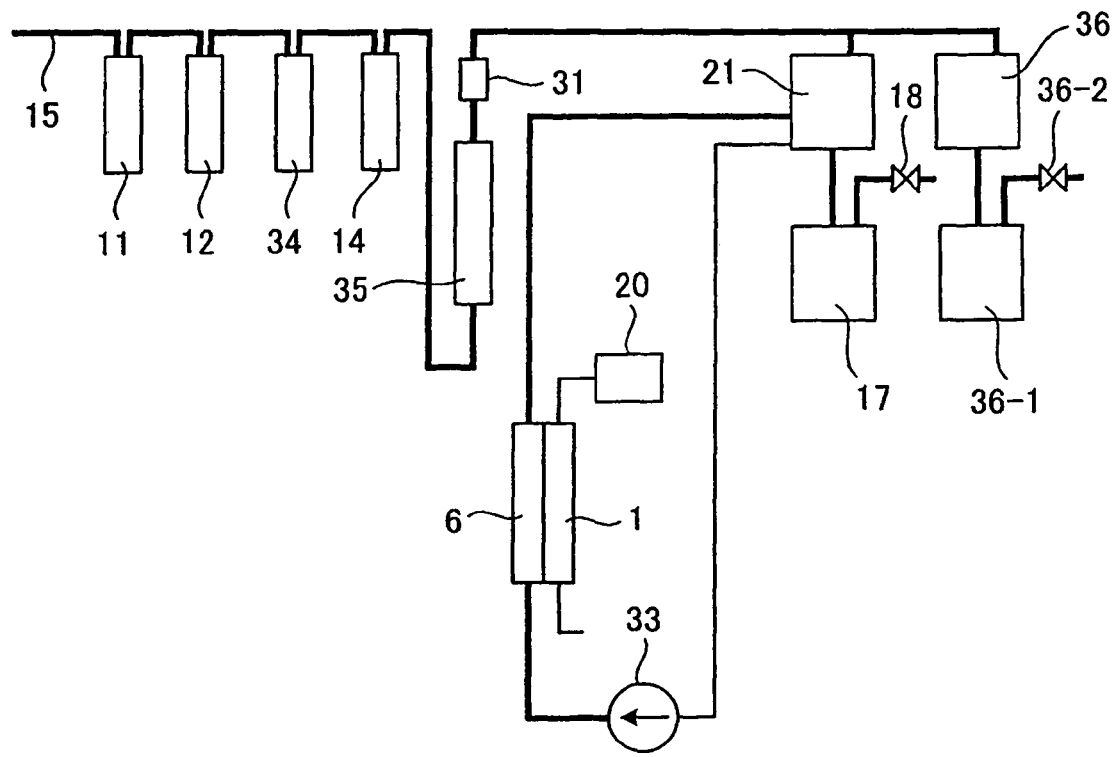
FIG. 13 is a system flow diagram of a hydrogen-dissolved drinking water production apparatus provided with an ion-exchange resin tower.

Example 9 employs a compact hydrogen-dissolved drinking water production apparatus for supplying warm hydrogen water and chilled hydrogen water. A flow of this system is illustrated in FIG. 13. The difference between the hydrogen-dissolved drinking water production apparatus illustrated in FIG. 13 and the hydrogen-dissolved drinking water production apparatus illustrated in FIG. 12 is that a precision filter 34 and an ion-exchange resin column 35 are used together instead of the reverse osmosis membrane filter 13.

Further, warm water treated using a filter can be stored in a hot water reservoir tank 36, and supplied via a hot water tank 36-1 and a hot water valve 36-2.

Example 10

Figure 14:
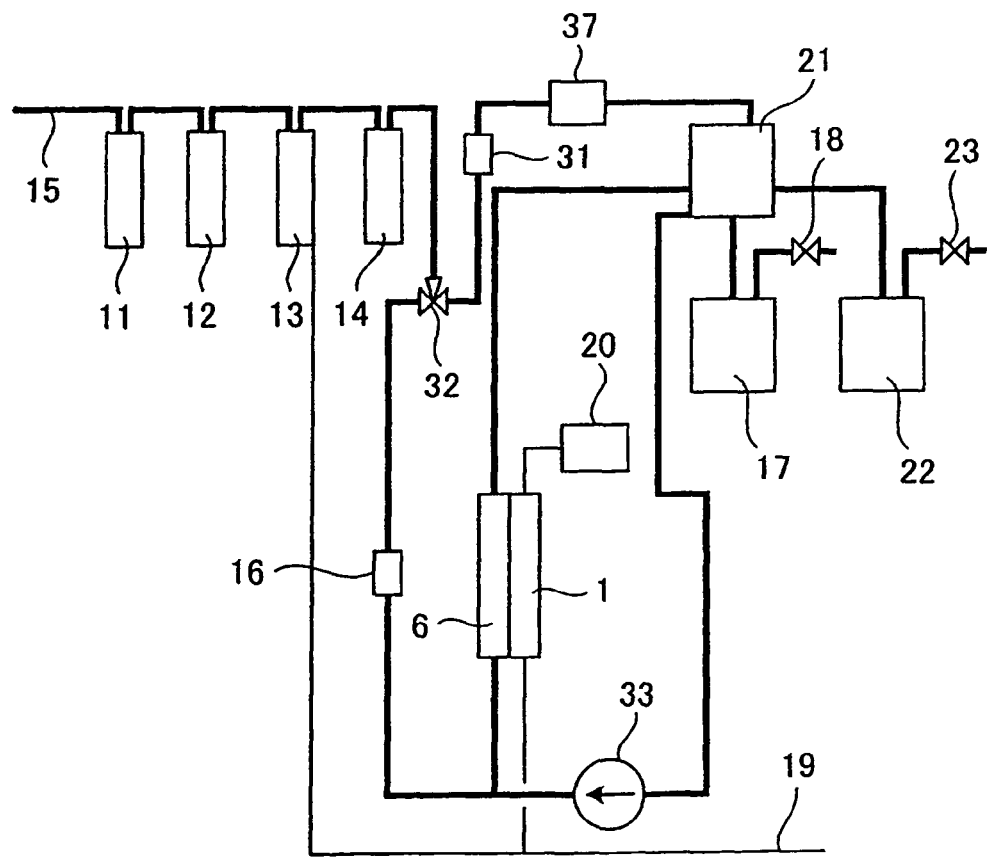
FIG. 14 is a system flow diagram of a hydrogen-dissolved drinking water production apparatus provided with a deaeration unit.

Example 10 employs a compact hydrogen-dissolved drinking water production apparatus that is provided with a deaeration unit. A flow of this system is illustrated in FIG. 14. The difference between the hydrogen-dissolved drinking water production apparatus illustrated in FIG. 14 and the hydrogen-dissolved drinking water production apparatus illustrated in FIG. 12 is that a deaeration unit 37 is arranged prior to the hydrogen water reservoir tank 21. Dissolved air in the raw water treated by the pre-filter 11, the pre-carbon filter 12, the reverse osmosis membrane filter 13, and the precision carbon filter 14 is evacuated by a deaeration unit 37. The resultant water is stored in the hydrogen water reservoir tank 21, and then circulated and supplied back to the cathode chamber 6 by the circulation pump 33 to increase the dissolved hydrogen concentration in the cathode-electrolyzed water.

Example 11

Figure 15:
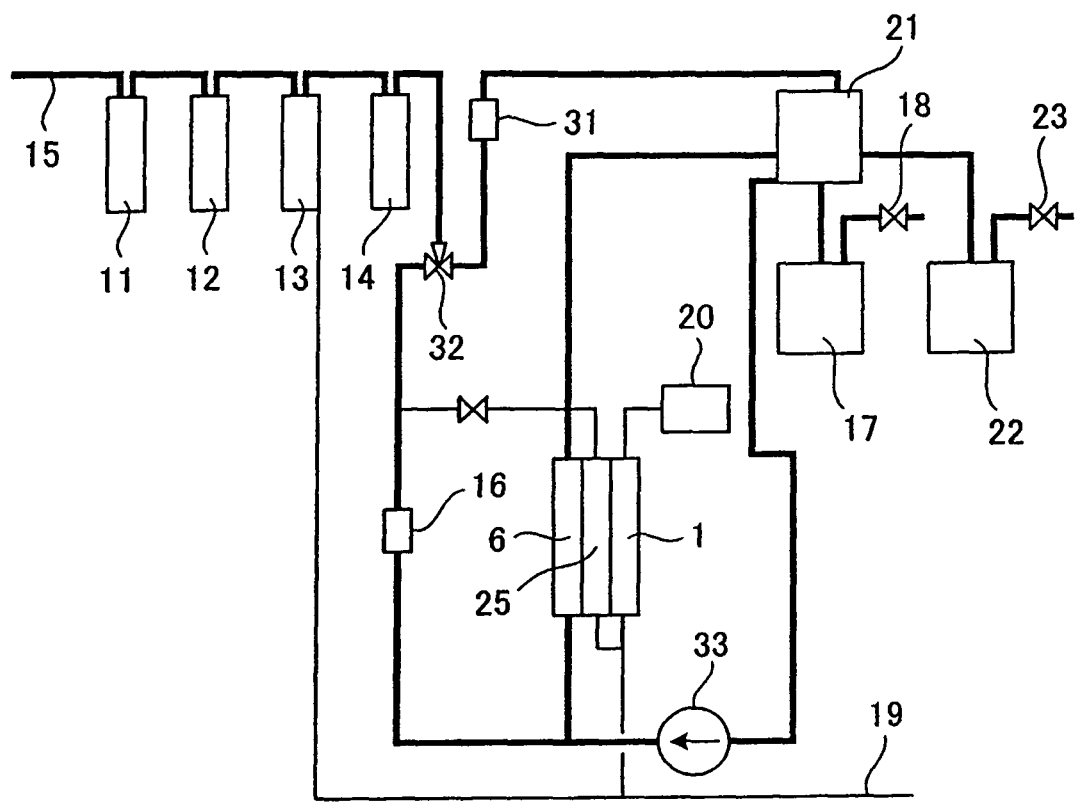
FIG. 15 is a system flow diagram of a hydrogen-dissolved drinking water production apparatus provided with a three-chamber electrolytic cell.

The present example relates to a hydrogen-dissolved drinking water production apparatus in which the three-chamber electrolytic cell according to the present invention illustrated in FIG. 6 is used as an example. A flow of this system is illustrated in FIG. 15. The difference between the hydrogen-dissolved drinking water production apparatus illustrated in FIG. 15 and the hydrogen-dissolved drinking water production apparatus illustrated in FIG. 12 is that the two-chamber electrolytic cell is changed to a three-chamber electrolytic cell. A middle chamber 25 is provided between the cathode chamber 6 and the anode chamber 1, and an ion-exchange resin is filled in the middle chamber. Consequently, the movement of an oxidizer, such as oxygen or ozone, produced in the anode chamber 1 to the cathode chamber 6 can be prevented. If an oxidizer such as ozone reacts with the hydrogen molecules, the hydrogen concentration may decrease. Therefore, it is highly desirable to prevent the movement of an oxidizer to the cathode chamber.

Example 12

Figure 16:
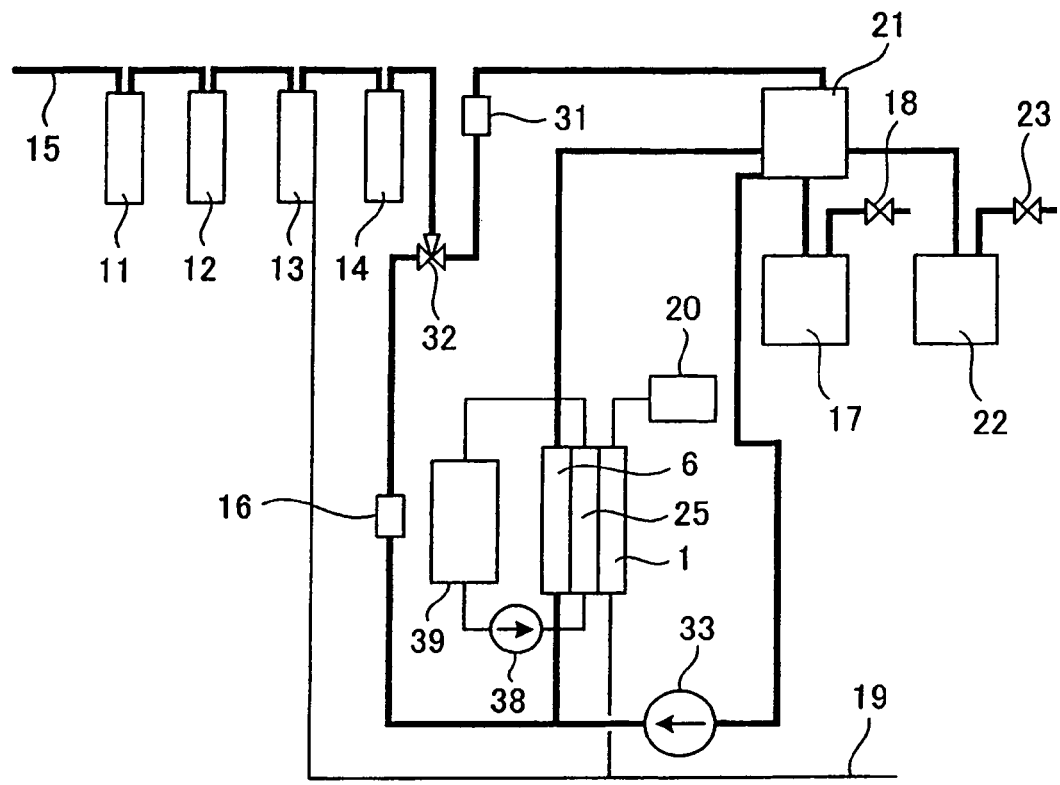
FIG. 16 is a system flow diagram of a hydrogen-dissolved drinking water production apparatus provided with means for supplying an aqueous solution of an organic acid.

FIG. 16 is a system flow diagram relating to an apparatus for producing hydrogen-dissolved water, which can easily maintain the pH of the cathode-electrolyzed water more stably from neutral to acidic by adding an organic acid that is a food additive, such as lactic acid or ascorbic acid into the middle chamber 25. The difference between the hydrogen-dissolved drinking water production apparatus illustrated in FIG. 16 and the hydrogen-dissolved drinking water production apparatus illustrated in FIG. 15 is that a middle chamber solution tank 39 is provided to circulate and supply the aqueous solution of an organic acid to the middle chamber 25, and a middle chamber solution circulation pump 38 for circulating an aqueous solution of an organic acid in a middle chamber tank to the middle chamber is provided.

Example 13

Figure 17:
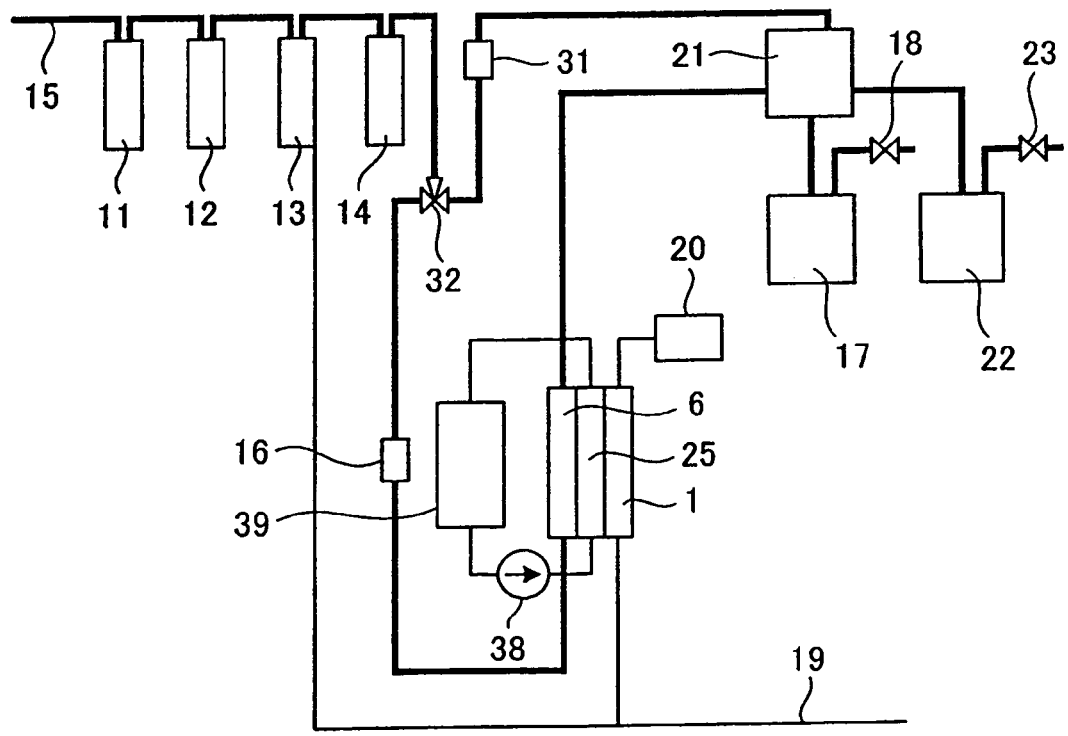
FIG. 17 is a system flow diagram of a hydrogen-dissolved drinking water production apparatus provided with a three-chamber electrolytic cell.

FIG. 17 illustrates a hydrogen-dissolved drinking water production apparatus provided with organic acid aqueous solution supply means in a middle chamber similar to that illustrated in FIG. 16. The hydrogen-dissolved drinking water production apparatus shown in FIG. 17 is a production apparatus for producing the cathode-electrolyzed water by passing water through once, and not circulating it. Producing the cathode-electrolyzed water by passing it through once enables the production efficiency of the hydrogen-dissolved water to be increased. Obviously, in this case, an electrolytic cell having a larger surface area than that for a circulating type is provided.

INDUSTRIAL APPLICABILITY

An apparatus can be provided for producing hydrogen-dissolved drinking water having a high dissolved hydrogen concentration and a long dissolved hydrogen life. Consequently, hydrogen-dissolved drinking water can be easily ingested, so that the adverse effects of active oxygen can be expected to be prevented.

The invention claimed is:

1. A hydrogen-dissolved drinking water production apparatus, comprising:
    an electrolytic cell comprising
        a vertical anode chamber having a water-permeable plate-shaped anode electrode,
        a vertical cathode chamber having a plate-shaped cathode electrode,
        a diaphragm of a fluorine-based cation exchange membrane separating the anode chamber and the cathode chamber, and
        an ion-exchange resin filling a space between the diaphragm and the cathode electrode,
    wherein
        the water-permeable plate-shaped anode electrode closely adheres to the diaphragm, and
        the plate-shaped cathode electrode closely adheres to an inner side wall of the cathode chamber which faces the diaphragm over the space,
        high-purity water having a conductivity of 50 µS/cm or less is supplied to the electrolytic cell, and
        water having a pH of 2.5-8.5 and a dissolved hydrogen molecule concentration of 0.1 ppm or more is produced.

2. The hydrogen-dissolved drinking water production apparatus according to claim 1, wherein in the cathode chamber of the electrolytic cell, the ion-exchange resin filled between the diaphragm and the cathode electrode is a cation exchange resin or a mixture of a cation exchange resin and an anion exchange resin.

3. The hydrogen-dissolved drinking water production apparatus according to claim 1, wherein in the cathode chamber of the electrolytic cell, the ion-exchange resin filled between the diaphragm and the cathode electrode is a fluorine-based cation exchange resin.

4. A method for producing hydrogen-dissolved drinking water, comprising:
supplying high-purity water having a conductivity of 50 μS/cm or less to the cathode chamber of the hydrogen-dissolved drinking water production apparatus according to claim 1,
electrolyzing the high-purity water at a current density of 0.1 A/cm$^2$ or more, and
extracting hydrogen-dissolved drinking water from the cathode chamber.

5. The hydrogen-dissolved drinking water production apparatus, according to claim 1, further comprising a pre-filter comprising a string-wound filter, a precision filter, an active carbon filter, or a filter system combining the pre-filter, the precision filter, and the active carbon filter on an upstream side of the electrolytic cell to supply the high-purity water to the electrolytic cell.

6. The hydrogen-dissolved drinking water production apparatus, according to claim 1, further comprising an ion-exchange resin column and/or a reverse osmosis membrane filter on an upstream side of the electrolytic cell to supply the high-purity water to the electrolytic cell.

7. The hydrogen-dissolved drinking water production apparatus according to claim 6, further comprising a pre-filter comprising a string-wound filter, a precision filter, an active carbon filter, or a filter system combining the pre-filter, the precision filter, and the active carbon filter prior to the ion-exchange resin column or the reverse osmosis membrane filter to reduce a load on the ion-exchange resin column or the reverse osmosis membrane filter.

8. The hydrogen-dissolved drinking water production apparatus according to claim 6, further comprising a deaeration device prior to the electrolytic cell for reducing a concentration of dissolved air in the high-purity water.

9. The hydrogen-dissolved drinking water production apparatus according to claim 1, further comprising a circulation line comprising a tank keeping the water produced and a circulation pump,
wherein the dissolved hydrogen molecule concentration is increased to 0.1 ppm or more in a range of pH 2.5 to 8.5 by circulating and electrolyzing the water produced in the cathode chamber.

10. The hydrogen-dissolved drinking water production apparatus according to claim 1, wherein the electrolytic cell further comprises
a cathode chamber inlet through which the high-purity water passes, present at an upstream end side of the electrolytic cell, and
a cathode chamber outlet through which the water produced discharges, present at a downstream end side of the electrolytic cell,
wherein the cathode chamber inlet and the cathode chamber outlet communicate with the space.

* * * * *

UNITED STATES PATENT AND TRADEMARK OFFICE
CERTIFICATE OF CORRECTION

PATENT NO. : 8,518,225 B2
APPLICATION NO. : 12/998265
DATED : August 27, 2013
INVENTOR(S) : Osao Sumita et al.

It is certified that error appears in the above-identified patent and that said Letters Patent is hereby corrected as shown below:

Title Page: Item 73

Please change the Assignee, "SPRING CO., LTD., TOKYO (JP)" to

--SPRING CO., LTD., TOKYO (JP) AND

TECH CORPORATION CO., LTD., HIROSHIMA-SHI (JP)--.

Signed and Sealed this
Seventh Day of January, 2014

Margaret A. Focarino
*Commissioner for Patents of the United States Patent and Trademark Office*